US011809168B2

(12) United States Patent
Peng et al.

(10) Patent No.: US 11,809,168 B2
(45) Date of Patent: Nov. 7, 2023

(54) METHOD, APPARATUS AND SYSTEM FOR DISPLAYING MEASUREMENT INFORMATION

(71) Applicant: Siemens Aktiengesellschaft, Munich (DE)

(72) Inventors: Yan bin Peng, Beijing (CN); Qing Gang Wang, Beijing (CN); Meng Zhang, Beijing (CN); Xiao Bo Yang, Beijing (CN); Yao Lei Kang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 199 days.

(21) Appl. No.: 17/299,389

(22) PCT Filed: Dec. 5, 2018

(86) PCT No.: PCT/CN2018/119398
§ 371 (c)(1),
(2) Date: Jun. 3, 2021

(87) PCT Pub. No.: WO2020/113476
PCT Pub. Date: Jun. 11, 2020

(65) Prior Publication Data
US 2022/0057778 A1    Feb. 24, 2022

(51) Int. Cl.
*G05B 19/418* (2006.01)
*G05B 19/042* (2006.01)
*G05B 19/409* (2006.01)

(52) U.S. Cl.
CPC ....... *G05B 19/418* (2013.01); *G05B 19/0425* (2013.01); *G05B 19/409* (2013.01); *G05B 2219/36168* (2013.01)

(58) Field of Classification Search
CPC ............ G01D 13/00; G01D 9/00; G01D 7/00; G01D 4/00; G01D 3/00; G01D 1/00;
(Continued)

(56) References Cited

U.S. PATENT DOCUMENTS

| 7,103,513 B2 | 9/2006 | Maier et al. |
| 2005/0028037 A1 | 2/2005 | Junk |

(Continued)

FOREIGN PATENT DOCUMENTS

| CN | 1313966 A | 9/2001 |
| CN | 1826565 A | 8/2006 |

(Continued)

OTHER PUBLICATIONS

PCT International Search Report and Written Opinion of International Searching Authority corresponding to PCT International Application No. PCT/CN119398 filed Dec. 5, 2018.

*Primary Examiner* — Kidest Bahta
(74) *Attorney, Agent, or Firm* — Harness, Dickey & Pierce, P.L.C.

(57) ABSTRACT

A method, apparatus and system are for displaying measurement information. An embodiment of the method includes: obtaining a display instruction for displaying measurement information of at least one second transmitter; and displaying, after obtaining the display instruction, the measurement information of the at least one second transmitter on a display screen of the a first transmitter. The first transmitter and the at least one second transmitter perform data communication with a distributed I/O device according to a preconfigured data transmission path. Further, the measurement information of the at least one second transmitter is obtained by means of the distributed I/O device according to the preconfigured data transmission path. The embodiment of the method enables an operator to conveniently view the measurement information of the second (Continued)

transmitter on the first transmitter nearby, without viewing the information on a remote device manager or the second transmitter.

20 Claims, 8 Drawing Sheets

(58) Field of Classification Search
CPC .............. G05B 19/0425; G05B 19/409; G05B 19/418; G05B 2219/36168
See application file for complete search history.

(56) References Cited

U.S. PATENT DOCUMENTS

| | | | | |
|---|---|---|---|---|
| 2005/0056106 | A1* | 3/2005 | Nelson | G12B 11/02 |
| | | | | 73/866.3 |
| 2005/0258959 | A1* | 11/2005 | Schnaare | G01F 1/363 |
| | | | | 340/592 |
| 2008/0320402 | A1 | 12/2008 | Isenmann et al. | |
| 2009/0139346 | A1* | 6/2009 | Klosinski | G01L 19/00 |
| | | | | 73/861.61 |
| 2009/0264150 | A1 | 10/2009 | Andreasson | |
| 2011/0215944 | A1* | 9/2011 | Hausler | G01D 11/24 |
| | | | | 340/870.02 |
| 2012/0006119 | A1* | 1/2012 | Broden | G01L 13/026 |
| | | | | 73/716 |
| 2012/0006120 | A1* | 1/2012 | Hedtke | G01D 3/02 |
| | | | | 73/717 |
| 2016/0314685 | A1* | 10/2016 | Sandoval-Castillo | |
| | | | | G05B 23/00 |
| 2017/0059743 | A1 | 3/2017 | Haupt et al. | |

FOREIGN PATENT DOCUMENTS

| | | |
|---|---|---|
| CN | 101334664 A | 12/2008 |
| CN | 106066637 A | 11/2016 |
| CN | 206095511 U | 4/2017 |
| DE | 69933895 T2 | 5/2007 |
| DE | 102017203472 A1 | 9/2018 |

* cited by examiner under the pre-con-
figured data transmission path.
METHOD, APPARATUS AND SYSTEM FOR DISPLAYING MEASUREMENT INFORMATION

PRIORITY STATEMENT

This application is the national phase under 35 U.S.C. § 371 of PCT International Application No. PCT/CN2018/119398 which has an International filing date of Dec. 5, 2018, the entire contents of each of which are hereby incorporated herein by reference.

FIELD

The present disclosure generally relates to the field of process instrument measurement, and more specifically, to a method, apparatus and system for displaying measurement information of at least one second transmitter on a display screen of a first transmitter.

BACKGROUND

In the field of process instrument measurement, some transmitters (for example, process instruments) usually provide no display screens or measurement information display buttons, such as temperature transmitters. When such a transmitter needs repairing due to a fault, or an operator wants to know current measurement information on the transmitter in a timely manner, the operator needs to acquire measurement information from a device manager (for example: SIMATIC PDM) or view the information on the device manager. Since transmitters are usually far from a device manager, it is very inconvenient for an operator to acquire measurement information about these transmitters, and it is impossible to accurately understand the operating conditions of these transmitters in a timely manner.

SUMMARY

Embodiments of the present disclosure provide a method, apparatus and system for displaying measurement information about at least one second transmitter on a display screen of a first transmitter. With at least one embodiment of the method, apparatus, and/or system, after acquisition of a display instruction for displaying measurement information about at least one second transmitter, measurement information about the at least one second transmitter is displayed on a display screen of a first transmitter (for example, the display screen of a transmitter near an operator), so that the operator can conveniently learn measurement information about the second transmitter, without the need to view measurement information about the second transmitter on a faraway device manager; thus, the operator can learn the measurement information about and operating status of the at least one second transmitter in a timely manner and, when the second transmitter has become faulty, repair it in a timely manner, thereby improving the maintenance efficiency.

According to one embodiment of the present disclosure, a method for displaying measurement information is provided, the method being used to display measurement information about at least one second transmitter on a display screen of a first transmitter, the first transmitter and the at least one second transmitter maintaining data communication with a distributed I/O device along a pre-configured data transmission path, the method comprising: acquiring a display instruction for displaying measurement information about the at least one second transmitter; and, after acquisition of the display instruction, displaying measurement information about the at least one second transmitter on a display screen of the first transmitter, wherein measurement information about the at least one second transmitter is acquired via the distributed I/O device along the pre-configured data transmission path.

According to another embodiment of the present disclosure, an apparatus for displaying measurement information is provided, the apparatus being used to display measurement information about at least one second transmitter on a display screen of a first transmitter, the first transmitter and the at least one second transmitter maintaining data communication with a distributed I/O device along a pre-configured data transmission path, the apparatus comprising: a measurement information acquisition unit configured to acquire measurement information about the at least one second transmitter; a display instruction acquisition unit configured to acquire a display instruction for displaying measurement information about the at least one second transmitter; and a display unit configured to display measurement information about the at least one second transmitter on a display screen of the first transmitter after acquisition of the display instruction.

According to another embodiment of the present disclosure, a system for displaying measurement information about at least one second transmitter on a display screen of a first transmitter is provided, comprising: a first transmitter comprising a display screen and an apparatus as described above for displaying measurement information about at least one second transmitter on a display screen of a first transmitter; at least one second transmitter; and a distributed I/O device.

According to another embodiment of the present disclosure, a computing device is provided, comprising: at least one processor; and a memory coupled with the at least one processor, configured to store an instruction that, when executed by the at least one processor, causes the at least one processor to implement at least one embodiment of the above-described method for displaying measurement information about at least one second transmitter on a display screen of a first transmitter.

According to another embodiment of the present disclosure, a non-volatile machine-readable storage medium is provided, which stores an executable instruction; the instruction, when executed, causes the machine to implement at least one embodiment of the above-described method for displaying measurement information about at least one second transmitter on a display screen of a first transmitter.

According to another embodiment of the present disclosure, a computer program product is provided; the computer program product is tangibly stored on a computer-readable medium and comprises a computer-executable instruction; the computer-executable instruction, when executed, causes at least one processor to implement at least one embodiment of the above-described method for displaying measurement information about at least one second transmitter on a display screen of a first transmitter.

BRIEF DESCRIPTION OF THE DRAWINGS

By referring to the following drawings, the nature and advantages of the present disclosure may be further understood. In the drawings, similar components or characteristics may have the same reference numerals.

REFERENCE NUMERALS IN THE DRAWINGS

Figure 1:
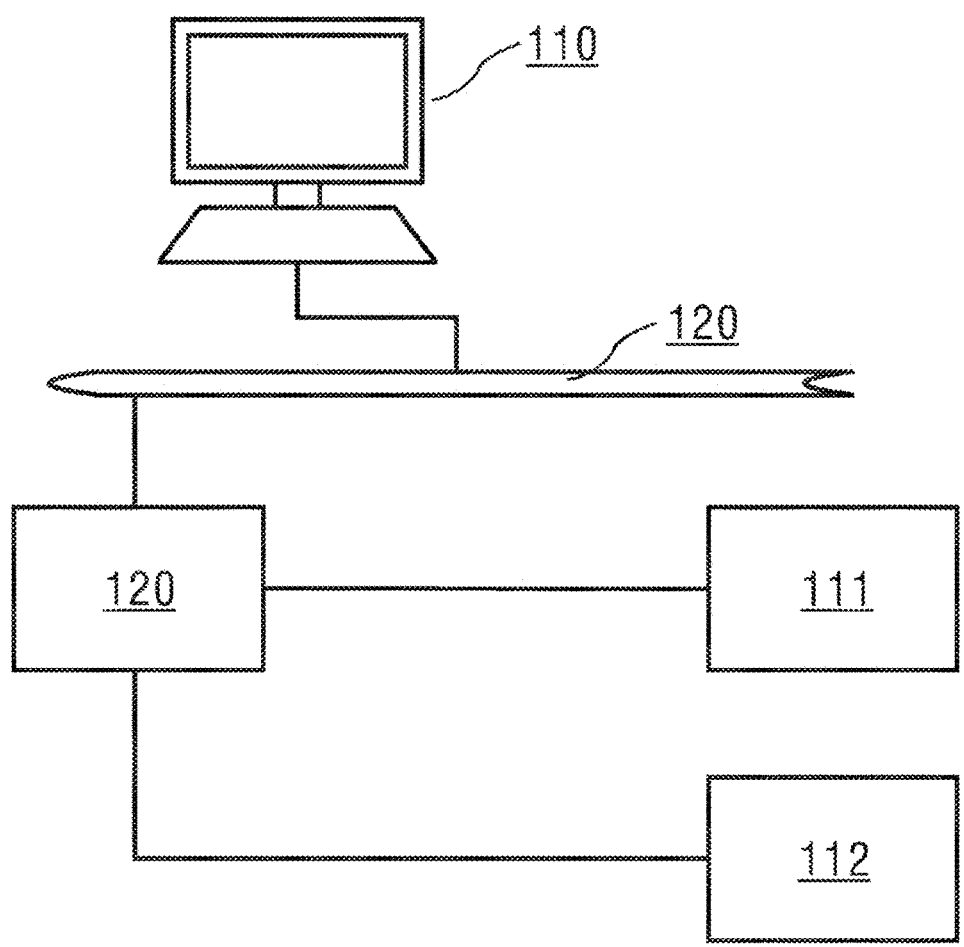
FIG. 1 shows a schematic diagram for an example of the structure of a transmitter measurement system in the prior art.

110: Device manager
111: Temperature transmitter
112: Pressure transmitter
120: Bus network
130: Distributed I/O device
1: Screen sharing display system
20: First transmitter
30: Second transmitter
40: Distributed I/O device
210: Display screen
220: Screen sharing display device
230: At least one display instruction button
240: Measurement information database
221: Measurement information acquisition unit
223: Display instruction acquisition unit
225: Display unit
226: Display format determination module
228: Display module
S610: Acquire a display instruction for displaying measurement information about at least one second transmitter.
S620: After acquisition of the display instruction, display the acquired measurement information about at least one second transmitter on a display screen of a first transmitter.
S621: Determine a display format of measurement information about each of the at least one second transmitter.
S623: In the determined display format of measurement information about each second transmitter, display the acquired measurement information about each of the at least one second transmitter on a display screen of the first transmitter.
800: Computing device
810: At least one processor
820: Memory

DETAILED DESCRIPTION OF THE EXAMPLE EMBODIMENTS

According to one embodiment of the present disclosure, a method for displaying measurement information is provided, the method being used to display measurement information about at least one second transmitter on a display screen of a first transmitter, the first transmitter and the at least one second transmitter maintaining data communication with a distributed I/O device along a pre-configured data transmission path, the method comprising: acquiring a display instruction for displaying measurement information about the at least one second transmitter; and, after acquisition of the display instruction, displaying measurement information about the at least one second transmitter on a display screen of the first transmitter, wherein measurement information about the at least one second transmitter is acquired via the distributed I/O device along the pre-configured data transmission path.

With at least one embodiment of this method, after acquisition of a display instruction for displaying measurement information about at least one second transmitter, measurement information about the at least one second transmitter is displayed on a display screen of a first transmitter (for example, the display screen of a transmitter near an operator), so that the operator can conveniently learn measurement information about the second transmitter, without the need to view measurement information about the second transmitter on a faraway device manager; thus, the operator can learn measurement information about and operating status of the at least one second transmitter in a timely manner and, when the second transmitter has become faulty, repair it in a timely manner, thereby improving the maintenance efficiency.

Optionally, in an example of the above-described embodiment, the display instruction comprises type information about the at least one second transmitter, and displaying measurement information about the at least one second transmitter on a display screen of the first transmitter comprises: on the basis of type information about the at least one second transmitter, determining a display format of measurement information about each of the at least one second transmitter; and, on the basis of the determined display format, displaying measurement information about each of the at least one second transmitter on a display screen of the first transmitter.

With at least one embodiment of this method, a display format of measurement information about each second transmitter is determined on the basis of type information about the second transmitter; in addition, since information is displayed on a first transmitter in a determined display format, measurement information about each of the at least one second transmitter may be displayed in a suitable display format; thus, the display of measurement information about the second transmitter on a display screen of the first transmitter better meets the requirement for displaying measurement information about the second transmitter.

Optionally, in an example of the above-described embodiment, the at least one second transmitter comprises at least one of the following transmitters: a transmitter with a display screen; and a transmitter without a display screen.

Optionally, in an example of the above-described embodiment, the display instruction is acquired from outside the first transmitter, or the first transmitter comprises at least one display instruction button, and the display instruction is acquired by operating at least one display instruction button on the first transmitter.

With at least one embodiment of this method, at least one display instruction button is provided on a first transmitter, which makes it more convenient to perform an operation of displaying measurement information about a second transmitter.

Optionally, in an example of the above-described embodiment, the pre-configured data transmission path is a measurement information transmission path set manually or automatically according to a user's task requirement.

With at least one embodiment of this method, by manually or automatically setting a measurement information transmission path according to a user's task requirement, a measurement information transmission path may be configured between a first transmitter with a display screen, at least one second transmitter, and a distributed I/O device that are located near the operator; thus, measurement information about at least one second transmitter may be transmitted to the first transmitter along the configured data transmission path; in addition, when a measurement information display instruction for at least one second transmitter is acquired, the measurement information about an operating status of the at least one second transmitter are displayed on the first transmitter near the operator; thus, the operator can learn the measurement information about an operating status of the at least one second transmitter in a timely manner and, when the second transmitter has become faulty, repair it in a timely manner, thereby improving the maintenance efficiency.

Optionally, in an example of the above-described embodiment, measurement information about the at least one second transmitter is acquired after acquisition of the display instruction, or acquired together with the display instruction, or acquired before acquisition of the display instruction.

Optionally, in an example of the above-described embodiment, the first transmitter is provided with a measurement information database, the measurement information database being used to store measurement information about a second transmitter and unique identification information about a second transmitter in association with each other, the display instruction comprises unique identification information about the at least one second transmitter, and measurement information about the at least one second transmitter is acquired from the measurement information database on the basis of the unique identification information about the at least one second transmitter.

With at least one embodiment of this method, the received measurement information about at least one second transmitter and unique identification information about the second transmitter are stored in association with each other in a measurement information database of the first transmitter; in addition, after receipt of a measurement information display instruction for a second transmitter, on the basis of the unique identification information about the second transmitter indicated in the received measurement information display instruction, the corresponding measurement information is acquired from the measurement information database for display; this makes it possible to selectively display measurement information about a second transmitter on a display screen of a first transmitter.

According to another embodiment of the present disclosure, an apparatus for displaying measurement information is provided, the apparatus being used to display measurement information about at least one second transmitter on a display screen of a first transmitter, the first transmitter and the at least one second transmitter maintaining data communication with a distributed I/O device along a pre-configured data transmission path, the apparatus comprising: a measurement information acquisition unit configured to acquire measurement information about the at least one second transmitter; a display instruction acquisition unit configured to acquire a display instruction for displaying measurement information about the at least one second transmitter; and a display unit configured to display measurement information about the at least one second transmitter on a display screen of the first transmitter after acquisition of the display instruction.

Optionally, in an example of the above-described embodiment, the display instruction comprises type information about the at least one second transmitter, and the display unit comprises: a display format determination module configured to determine a display format of measurement information about each of the at least one second transmitter on the basis of type information about the at least one second transmitter; and a display module configured to display measurement information about each of the at least one second transmitter on a display screen of the first transmitter in a determined display format. Optionally, in an example of the above-described aspect, the display instruction acquisition unit is configured to acquire the display instruction from outside the first transmitter, or the first transmitter comprises at least one display instruction button, and the display instruction acquisition unit is configured to acquire the display instruction by operating at least one display instruction button on the first transmitter.

Optionally, in an example of the above-described embodiment, the measurement information acquisition unit is configured to acquire measurement information about the at least one second transmitter after acquisition of the display instruction, or acquire measurement information about the at least one second transmitter together with the display instruction, or acquire measurement information about the at least one second transmitter before acquisition of the display instruction.

Optionally, in an example of the above-described embodiment, the first transmitter is provided with a measurement information database, the measurement information database being used to store measurement information about a second transmitter and unique identification information about a second transmitter in association with each other, the display instruction comprises unique identification information about the at least one second transmitter, and the measurement information acquisition unit is configured to acquire measurement information about the at least one second transmitter from the measurement information database on the basis of the unique identification information about the at least one second transmitter.

According to another embodiment of the present disclosure, a system for displaying measurement information about at least one second transmitter on a display screen of a first transmitter is provided, comprising: a first transmitter comprising a display screen and an apparatus as described above for displaying measurement information about at least one second transmitter on a display screen of a first transmitter; at least one second transmitter; and a distributed I/O device.

According to another embodiment of the present disclosure, a computing device is provided, comprising: at least one processor; and a memory coupled with the at least one processor, configured to store an instruction that, when executed by the at least one processor, causes the at least one processor to implement at least one embodiment of the above-described method for displaying measurement information about at least one second transmitter on a display screen of a first transmitter.

According to another embodiment of the present disclosure, a non-volatile machine-readable storage medium is provided, which stores an executable instruction; the instruction, when executed, causes the machine to implement at least one embodiment of the above-described method for displaying measurement information about at least one second transmitter on a display screen of a first transmitter.

According to another embodiment of the present disclosure, a computer program product is provided; the computer program product is tangibly stored on a computer-readable medium and comprises a computer-executable instruction; the computer-executable instruction, when executed, causes at least one processor to implement at least one embodiment of the above-described method for displaying measurement information about at least one second transmitter on a display screen of a first transmitter.

The subject matter described herein will be discussed below with reference to example embodiments. It should be understood that the discussion of these embodiments is only intended to allow those of ordinary skill in the art to better understand and implement the subject described herein, instead of limiting the scope of protection, applicability, or examples as described in the claims. The functions and arrangements of the discussed elements may be changed without departing from the scope of protection of the present disclosure. In each example, various processes or components may be omitted, replaced, or added as needed. For example, a described method may be implemented in a sequence different from the described one, and various steps may be added, omitted, or combined. In addition, characteristics described with respect to some examples may also be combined in other examples.

As used herein, the term "comprising" and variants thereof mean open terms, meaning "including but not limited to". The term "on the basis of" means "based at least in part on". The terms "an embodiment" and "one embodiment" mean "at least one embodiment". The term "another embodiment" means "at least one other embodiment". The terms "first", "second", etc. may refer to different or the same objects. Other definitions can be included below, explicitly or implicitly. Unless clearly otherwise specified in the context, the definition of a term remains consistent throughout the description.

As used herein, the term "measurement information about a transmitter" refers to a measurement signal monitored by a transmitter or measurement status information about a transmitter. The measurement status information may be, for example, that the operating status of a transmitter is normal, abnormal, etc.

FIG. 1 shows a schematic diagram for an example of the structure of a transmitter measurement system in the prior art.

As shown in FIG. 1, the transmitters 111 and 112 are connected to the distributed I/O device 130; for example, the transmitters 111 and 112 are connected to the distributed I/O device 130 through a HART bus (HART network), so that the HART protocol is run for data transmission between the transmitters 111 and 112 and the distributed I/O device 130. The transmitter 111 may be, for example, a temperature transmitter without a display screen, and the transmitter 112 may be a pressure sensor with a display screen. In FIG. 1, only two transmitters are shown; however, another example structure may comprise more or fewer transmitters.

In the present disclosure, a transmitter refers to a device that converts measurement information about a sensor directly connected to it into a standard signal. For example, the pressure transmitter 112 is a device that converts pressure into a pneumatic signal or an electric signal for control and remote transmission. It can convert a physical pressure parameter of a gas, a liquid, etc. felt by a load cell sensor into a standard electrical signal (for example, 4 mA-10 mA DC), which is then provided for secondary instruments, such as indicator alarms, recorders, or regulators for measurement, indication, and process adjustment.

The distributed I/O device 130 is connected to a device manager 110 with a display screen through, for example, a bus network 120 running the PROFIBUS DP protocol. In the application of factory automation, the device manager 110 can, using the PROFIBUS DP protocol, establish data communication, via the bus network 120, with other devices connected to the bus network 120, such as the distributed I/O device 130, to acquire information about each transmitter and/or other process devices. The distributed I/O device 130 may be, for example, an ET100M or ET100S.

The device manager 110 may be SIMATIC PDM, for example. SIMATIC PDM is a manufacturer's general-purpose tool for configuration, parameter allocation, commissioning, diagnosis, and maintenance of intelligent process device and automation components. The user interface of SIMATIC PDM is designed on the basis of the Microsoft Windows standard guidelines. It provides a menu structure, toolbar, and browser view, making it convenient to navigate between parameter groups. With SIMATIC PDM, a single software program may be used to configure various field devices produced by different manufacturers, and process device data may be conveniently set, modified, checked for plausibility, managed, and simulated. In addition, process values, alarm information, and status signals monitored by a process device may also be monitored and displayed online.

Data monitored by the transmitters 111 and 112 are transmitted to the distributed I/O device 130 via the HART bus, and then transmitted to the device manager 110 via the bus network 120 for display on a display screen of the device manager 110.

In the transmitter measurement system shown in FIG. 1, for a transmitter without a display screen, when an operator needs to know measurement information about the transmitter, the operator needs to go to the device manager 110 and view measurement information about the transmitter on the display screen of the device manager 110, or obtain measurement information about the transmitter from the device manager 110, for example, by way of remote communication. In such a case, since transmitters are usually far from the device manager 110, it is very inconvenient for the operator to acquire measurement information about the transmitters from the device manager 110, and it is also impossible to, accurately and in a timely manner, understand the operating conditions of these transmitters that do not have a display screen.

In order to allow an operator to understand measurement information about transmitters (for example, a transmitter without a display screen or a transmitter with a display screen that is far away from the operator) accurately and in a timely manner without having to obtain measurement information about the transmitters from a device manager or go to a device manager and then view measurement information about the transmitters on the display screen of the device manager, the present disclosure provides a system for displaying measurement information about at least one second transmitter on a display screen of a first transmitter. Using this system, a measurement information transmission path is configured between a first transmitter with a display screen, at least one second transmitter, and a distributed I/O device, and measurement information about the at least one second transmitter is transmitted to the first transmitter via the distributed I/O device along the configured measurement information transmission path. Then, when the first transmitter receives a display instruction for displaying measurement information about at least one second transmitter, measurement information about the corresponding second transmitter is displayed on the display screen of the first transmitter. This allows the operator to know measurement information about the second transmitter in a timely manner and accurately without having to obtain measurement information from a device manager or view measurement information about the transmitter on the display of a device manager, and then acquire an operating status of the second transmitter.

Figure 2:
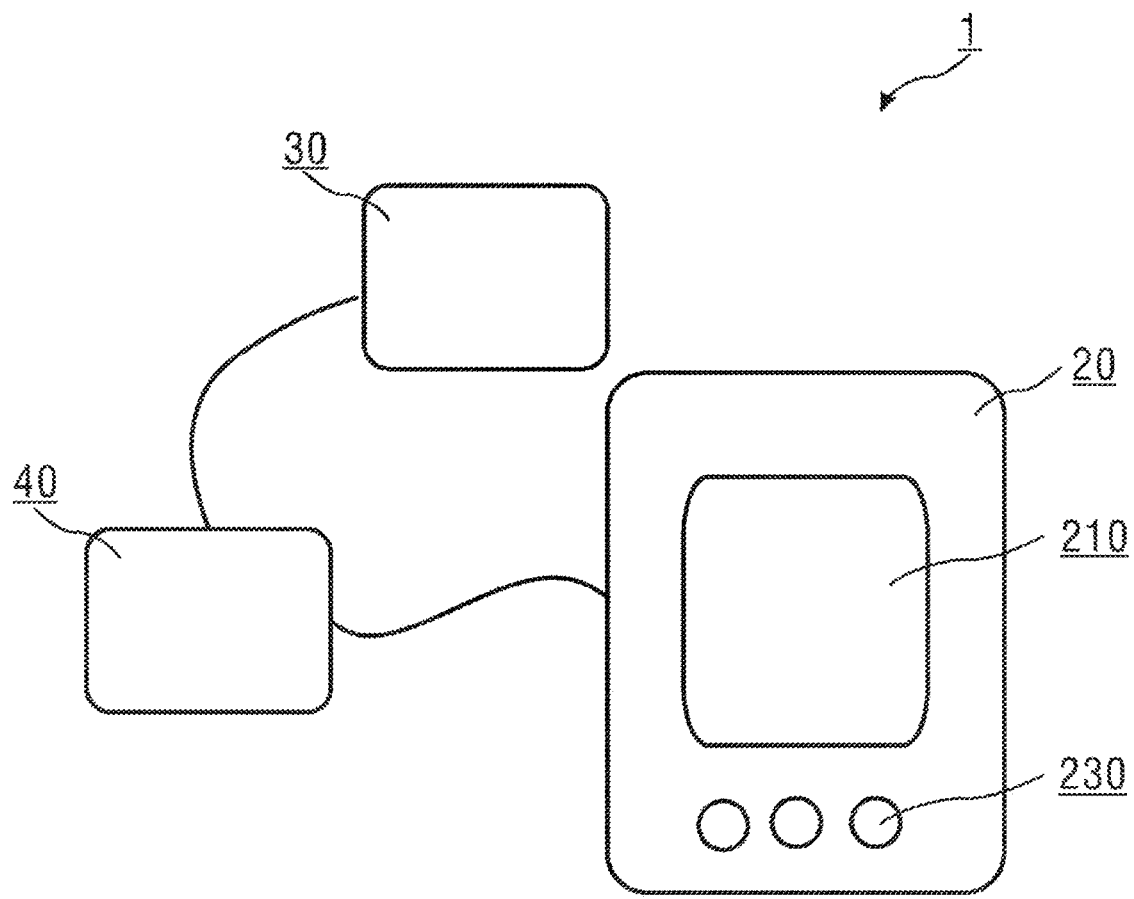
FIG. 2 shows a block diagram for a system for displaying measurement information about at least one second transmitter on a display screen of a first transmitter according to an embodiment of the present disclosure.

FIG. 2 shows a block diagram for a system (hereinafter referred to as "the screen sharing display system") 1 for displaying measurement information about at least one second transmitter on a display screen of a first transmitter according to an embodiment of the present disclosure.

As shown in FIG. 2, the screen sharing display system comprises a first transmitter 20, at least one second transmitter 30, and a distributed I/O device 40. The first transmitter 20 is provided with a display screen 210. The display screen 210 is used to display measurement information monitored by the first transmitter 20. The first transmitter 20 may be a pressure transmitter, for example. The at least one second transmitter 30 may comprise one or more second transmitters 30, which are respectively used for sensing corresponding measurement information. The at least one second transmitter 30 may be, for example, a temperature transmitter. In the present disclosure, the second transmitter 30 may be a transmitter without a display screen, or a transmitter with a display screen, for example, a transmitter with a display screen that is far away from an operator or any transmitter with a display screen. This makes it possible to display measurement information on a transmitter without a display screen, or to display measurement information on a faraway transmitter with a display screen that is not readily accessible to an operator, or to display measurement information about a plurality of transmitters on a single transmitter.

In the present disclosure, the first transmitter 20, the at least one second transmitter 30, and the distributed I/O device 40 may be HART devices; the first transmitter 20 and the at least one second transmitter 30 are connected to the distributed I/O device 40 through a HART bus. A data transmission path is pre-configured between the first transmitter 20 and also the at least one second transmitter 30 and the distributed I/O device 40, and the highway addressable remote transducer (HART) protocol is used for data communication along the pre-configured data transmission path.

The HART protocol is an open communication protocol that can address high-speed channels of remote sensors. In the HART protocol, using a frequency-shift keying (FSK) signal based on the Bell102 standard, an audio digital signal with an amplitude of 0.5 mA is superimposed on a low-frequency 4 mA-10 mA analog signal for two-way digital communication at a data transmission rate of 1.2 kbps. Since the average value of FSK signals is 0, which does not affect the magnitude of an analog signal transmitted to a control system, compatibility with an existing analog system is ensured.

In the present disclosure, the pre-configured data transmission path is a measurement information transmission path set manually or automatically according to a user's task requirement. For example, a transmitter with a display screen that is close to an operator may be selected as the first transmitter 20, and at least one transmitter whose measurement information the operator needs to monitor may be selected as the at least one second transmitter 30. Then, a data transmission path is pre-configured between the selected first transmitter 20, the selected at least one second transmitter 30, and the associated distributed I/O device 40; this allows measurement information monitored on the at least one second transmitter 30 to be transmitted to the first transmitter 20 along the pre-configured data transmission path, and then be displayed on a display screen of the first transmitter 20.

In addition, the first transmitter 20 is further configured to, after acquiring a display instruction for displaying measurement information about at least one second transmitter 30, display measurement information about at least one second transmitter 30 on the display screen 210 of the first transmitter 20, so that screen sharing display with the display screen 210 of the first transmitter 20 is realized between the at least one second transmitter 30. It should be noted that the at least one second transmitter 30 may be part or all of the second transmitter 30 that has a data transmission path configured with the first transmitter 20 in advance.

In addition, in another example of the present disclosure, the screen sharing display system 1 may further comprise an alarm (not shown). The alarm can send an alarm signal when measurement information currently displayed on the display screen 210 indicates an information abnormality. For example, when temperature measurement information about the currently displayed temperature transmitter becomes abnormal, the alarm sends a temperature alarm signal, for example, sending an audible alarm or flashing an indicator lamp, to remind an engineer to repair the temperature transmitter.

Figure 3:
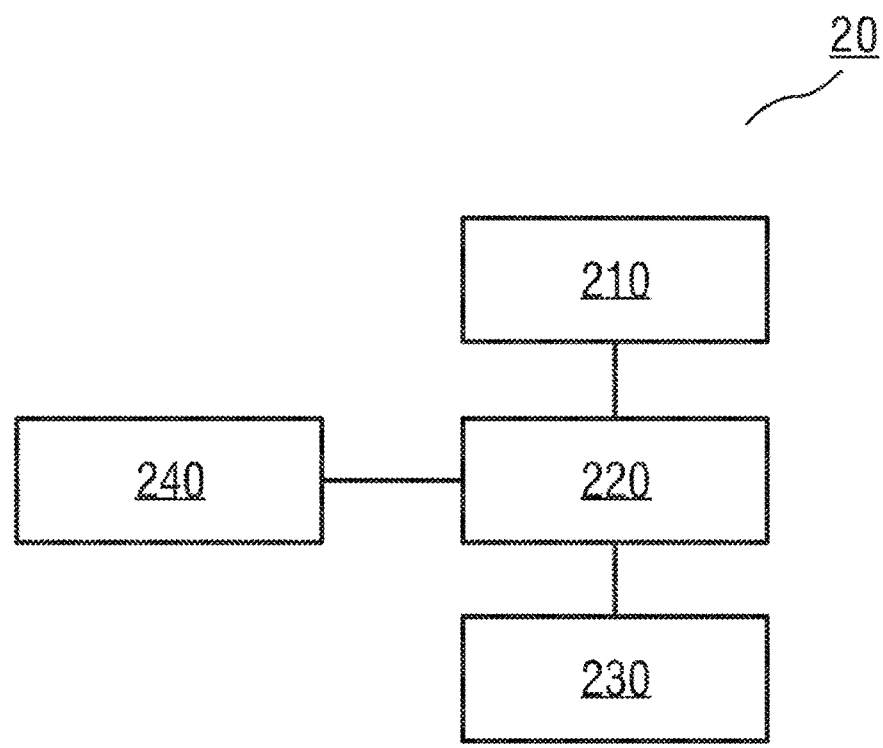
FIG. 3 shows a structural block diagram for a first transmitter according to an embodiment of the present disclosure.

FIG. 3 shows a structural block diagram for an example of the first transmitter 20 according to an embodiment of the present disclosure. As shown in FIG. 3, the first transmitter 20 comprises a display screen 210 and a screen sharing display device 220.

The screen sharing display device 220 is configured to, after acquiring a display instruction for displaying measurement information about at least one second transmitter 30, display measurement information about the at least one second transmitter 30 on the display screen 210 of the first transmitter 20. Here, measurement information about at least one second transmitter 30 may be acquired via the distributed I/O device 40 along a pre-configured data transmission path. For example, after the second transmitter 30 has monitored measurement information, the second transmitter 30 can transmit the monitored measurement information to the distributed I/O device 40 along the pre-configured data transmission path, and store it in the distributed I/O device 40, so that the first transmitter 20 can acquire the information after receiving a display instruction. Alternatively, the distributed I/O device may receive measurement information from the second transmitter 30, and then forward the received measurement information to the first transmitter 20 along a pre-configured data transmission path, so that the first transmitter 20 stores the information for subsequent display.

The display instruction may be acquired from outside the first transmitter 20; for example, in one example, the display instruction may be sent from the second transmitter 30 and sent to the first transmitter 20 via the distributed I/O device 40, or sent to the first transmitter 20 via the distributed I/O device 40. Alternatively, in another example, the first transmitter 20 may comprise at least one display instruction button 230. The display instruction is acquired by operating at least one display instruction button 230 on the first transmitter 20. It should be noted that the display instruction may correspond to one transmitter, some transmitters, or all transmitters among the second transmitters 30 for which a data transmission path has been configured in advance.

At least one display instruction button 230 may be arranged on the display screen 210 of the first transmitter 20 or at another suitable position of the first transmitter 20, and used by a user to issue a display instruction targeting measurement information about at least one second transmitter 30. For example, the at least one display instruction button 230 may be designed as a hardware button device or a virtual button on the display screen 210; in addition, each of the at least one display instruction button 230 is arranged to correspond to one second transmitter among the at least one second transmitter 30, so that when the display instruction button 230 is operated by a user, a display instruction targeting measurement information about the corresponding second transmitter is issued. Alternatively, each of the at least one display instruction button 230 may also be arranged to correspond to a plurality of second transmitters among the at least one second transmitter 30; thus, when the display instruction button 230 is operated by a user, an operation menu for selecting a transmitter among the corresponding plurality of second transmitters is triggered for transmitter selection by the user; in addition, after the user selects a target second transmitter, a display instruction targeting measurement information about the selected second transmitter is issued.

Measurement information about at least one second transmitter 30 may be acquired by the first transmitter 20 from the second transmitter 30 or the distributed I/O device 40 after the display instruction is acquired, or may be sent to the first transmitter 20 together with the display instruction, or may be acquired by the first transmitter 20 from the second transmitter 30 or the distributed I/O device 40 before the display instruction is acquired.

In a case where measurement information about at least one second transmitter 30 is acquired by the first transmitter 20 from the second transmitter 30 or the distributed I/O device before the display instruction is acquired, the first transmitter 20 may further comprise a measurement information database 240. The measurement information database 240 is used to store measurement information about the second transmitter and unique identification information about the second transmitter 30 in association with each other. The unique identification information may be, for example, device identification information or location information about the second transmitter 30, or other unique identification information that can uniquely identify the second transmitter. Correspondingly, the display instruction may comprise unique identification information about at least one second transmitter 30. After receiving the display instruction, the first transmitter 20 acquires measurement information about the corresponding second transmitter 30 from the measurement information database 240 on the basis of the unique identification information about the second transmitter 30 included in the display instruction, and displays it.

Furthermore, in another example of the present disclosure, the measurement information may refer to measurement information in the current predetermined time period, for example, measurement information within the current 10 seconds.

Figure 4:
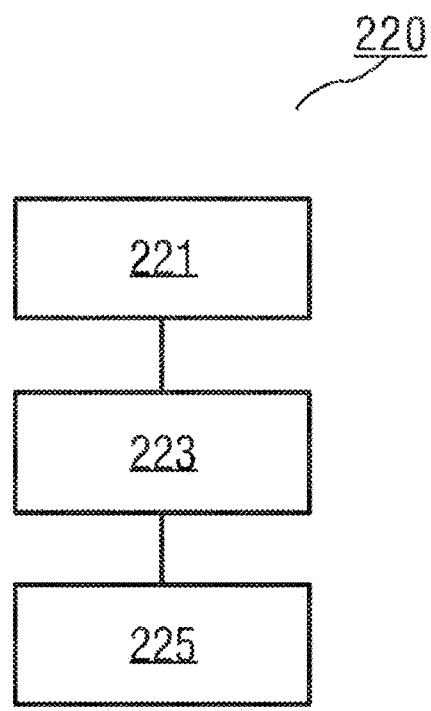
FIG. 4 shows a block diagram for an apparatus for displaying measurement information about at least one second transmitter on a display screen of a first transmitter according to an embodiment of the present disclosure.

FIG. 4 shows a block diagram for an example of the screen sharing display device 220 according to an embodiment of the present disclosure. As shown in FIG. 4, the screen sharing display device 220 comprises a measurement information acquisition unit 221, a display instruction acquisition unit 223, and a display unit 225.

The measurement information acquisition unit 221 is configured to obtain measurement information about at least one second transmitter 30. The display instruction acquisition unit 223 is configured to acquire a display instruction for displaying measurement information about at least one second transmitter 30.

In an example of the present disclosure, the measurement information acquisition unit 221 may obtain measurement information about at least one second transmitter 30 from the second transmitter 30 or the distributed I/O device 40 after acquiring the display instruction. In another example, the measurement information acquisition unit 221 may acquire measurement information about at least one second transmitter 30 from the second transmitter 30 or the distributed I/O device together with the display instruction. Alternatively, the measurement information acquisition unit 221 may acquire measurement information about at least one second transmitter 30 from the second transmitter 30 or the distributed I/O device 40 before acquiring the display instruction.

In the case where measurement information about at least one second transmitter 30 is acquired from the second transmitter 30 or the distributed I/O device 40 before the display instruction is acquired, the first transmitter 20 may further comprise a measurement information database 240. The measurement information database 240 is used to store measurement information about the second transmitter 30 and unique identification information about the second transmitter in association with each other. The unique identification information may be, for example, device identification information or location information about the second transmitter 30, or other unique identification information that can uniquely identify the second transmitter. Correspondingly, the display instruction may comprise unique identification information about at least one second transmitter 30. After receiving the display instruction, the measurement information acquisition unit 221 acquires measurement information about the corresponding second transmitter 30 from the measurement information database 240 on the basis of the unique identification information about the second transmitter 30 included in the display instruction.

In an example of the present disclosure, the display instruction acquisition unit 223 is configured to acquire a display instruction for displaying measurement information about at least one second transmitter 30 from outside the first transmitter 20. For example, the display instruction acquisition unit 223 may be configured to receive a display instruction for displaying measurement information about at least one second transmitter 30 from the second transmitter 30 or the distributed I/O device 40. Alternatively, in another example, the first transmitter 20 may comprise at least one display instruction button 230. The at least one display instruction button 230 may be arranged on the display screen 210 of the first transmitter 20 or at another suitable position of the first transmitter 20, and used by a user to trigger a display instruction for displaying measurement information about at least one second transmitter 30. The display instruction acquisition unit 223 is configured to, by monitoring whether at least one display instruction button 230 on the first transmitter 20 is operated, acquire a display instruction for displaying measurement information about at least one second transmitter 30. For details about how a display instruction is acquired by monitoring whether at least one display instruction button 230 is operated, see the operation on the at least one display instruction button 230 described above in conjunction with FIG. 2, which will not be described in detail again herein.

The display unit 225 is configured to display measurement information about the at least one second transmitter 30 on the display screen 210 of the first transmitter 20 after acquiring a display instruction for displaying measurement information about the at least one second transmitter 30.

Figure 5:
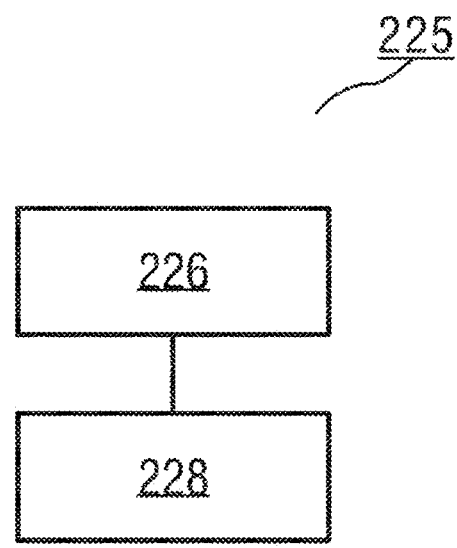
FIG. 5 shows a block diagram for an implementation example of the display unit as shown in FIG. 4.

FIG. 5 shows a block diagram for an implementation example of the display unit 225 as shown in FIG. 4. As shown in FIG. 5, the display unit 225 comprises a display format determination module 226 and a display module 228. In an implementation example, a display instruction for displaying measurement information about at least one second transmitter 30 may comprise type information about the at least one second transmitter 30. The type information may be, for example, model information, device type information, etc. about the second transmitter 30. Measurement information about each type of second transmitter 30 needs to be displayed in a corresponding display format.

After receiving a display instruction for displaying measurement information about at least one second transmitter 30, the display format determination module 226 determines the display format of measurement information about each of the at least one second transmitter 30 on the basis of type information about the at least one second transmitter 30 in the display instruction.

Then, the display module 228 displays measurement information about each of the at least one second transmitter 30 on the display screen 210 of the first transmitter 20 in the determined display format.

With the above-described solution, a display format of measurement information about each second transmitter is determined according to type information about each of the at least one second transmitter; in addition, measurement information about each second transmitter is displayed on a display screen of a first transmitter in the determined display format, so that the display of measurement information about the second transmitter on a display screen of the first transmitter better meets a requirement for displaying measurement information about the second transmitter.

Figure 6:
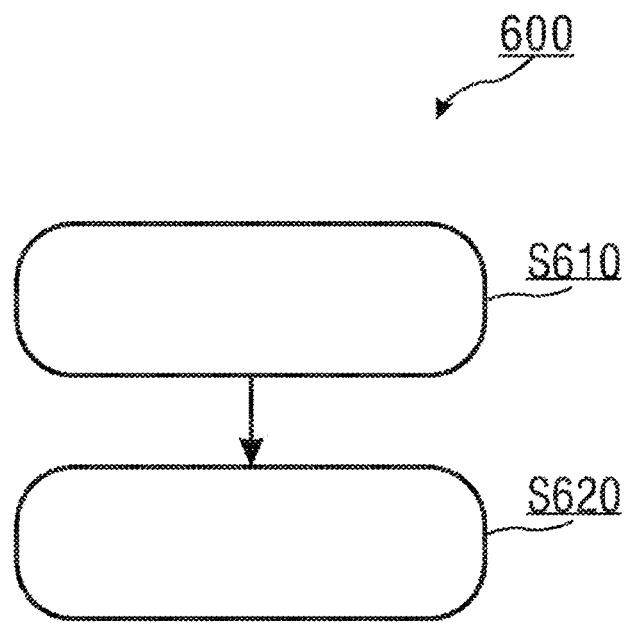
FIG. 6 shows a flowchart for a method for displaying measurement information about at least one second transmitter on a display screen of a first transmitter according to an embodiment of the present disclosure.

FIG. 6 shows a flowchart for a method for displaying measurement information about at least one second transmitter on a display screen of a first transmitter according to an embodiment of the present disclosure, the method being performed by a screen sharing device of the first transmitter.

As shown in FIG. 6, in block S610, a display instruction for displaying measurement information about at least one second transmitter 30 is acquired. For the operation performed at block S610, reference may made to the operation performed by the display instruction acquisition unit 223 described above in conjunction with FIGS. 3 and 4.

After the display instruction is acquired, in block S620, measurement information about at least one second transmitter 30 is displayed on the display screen 210 of the first transmitter 20. For the operation performed at block S620, reference may be made to the operation performed by the display instruction unit 225 described above in conjunction with FIGS. 3, 4, and 5. Here, measurement information about at least one second transmitter 30 may be acquired via the distributed I/O device 40 along the pre-configured data transmission path. For the process for acquiring measurement information about the second transmitter 30, reference may be made to the operation performed by the measurement information acquisition unit 221 described above in conjunction with FIGS. 3 and 4.

Figure 7:
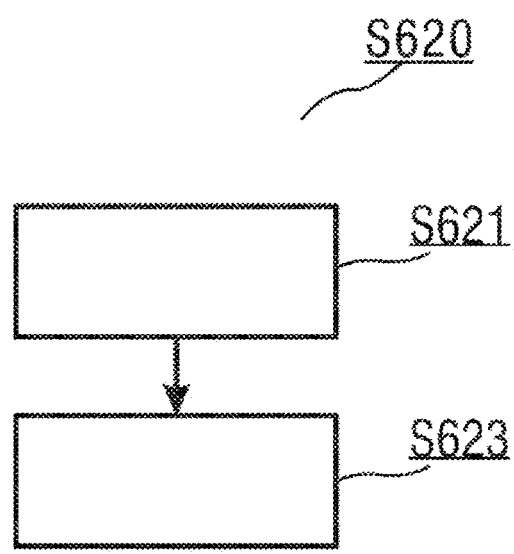
FIG. 7 shows a flowchart for an example of the process of displaying acquired measurement information about at least one second transmitter as shown in FIG. 6.

FIG. 7 shows a flowchart for an example of the process for displaying the acquired measurement information about the at least one second transmitter 30 in FIG. 6. In this example, the display instruction comprises type information about at least one second transmitter 30.

As shown in FIG. 7, after acquisition of a display instruction for displaying measurement information about at least one second transmitter 30, at block S621, on the basis of type information about at least one second transmitter 30 in the display instruction, a display format of measurement information about each of the at least one second transmitter is determined. For the operation performed at block S621, reference may be made to the operation performed by the display format determination module 226 described above in conjunction with FIG. 5.

After a display format of measurement information about each second transmitter 30 is determined, at block S623, measurement information about each of at least one second transmitter 30 is displayed on the display screen 210 of the first transmitter 20 in the determined display format. For the operation performed at block S623, reference may be made to the operation performed by the display module 228 described above in conjunction with FIG. 5.

With a method, apparatus, and system for displaying measurement information about at least one second transmitter on a display screen of a first transmitter according to the present disclosure, before a method according to the present disclosure is performed, a transmitter with a display screen that an operator may operate conveniently (for example, one that is close to an operator) is selected as a first transmitter, at least one transmitter whose measurement information needs to be monitored is selected as at least one second transmitter, and a data transmission path is configured in advance between the first transmitter, the at least one second transmitter, and a distributed I/O device; thus, measurement information monitored on at least one second transmitter may be transmitted to the first transmitter along the configured data transmission path, so that when the first transmitter receives a display instruction for displaying measurement information about a second transmitter, measurement information about the corresponding second transmitter is displayed on the display screen of the first transmitter, which makes it more convenient for the operator to perform measurement information monitoring operations.

Embodiments of a method, apparatus, and system for displaying measurement information about at least one second transmitter on a display screen of a first transmitter according to the present disclosure have been described above with reference to FIGS. 1 to 7. The above-described screen sharing display device may be implemented by hardware, or by software, or by a combination of hardware and software.

Figure 8:
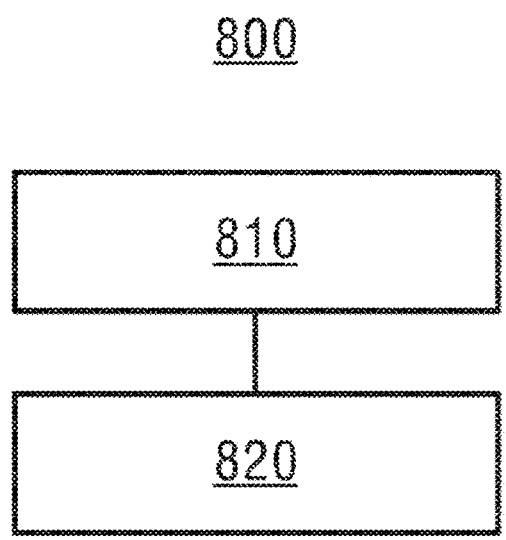
FIG. 8 shows a block diagram for a computing device for displaying measurement information about at least one second transmitter on a display screen of a first transmitter according to an embodiment of the present disclosure.

FIG. 8 shows a block diagram for a computing device 800 for displaying measurement information about at least one second transmitter on a display screen of a first transmitter according to an embodiment of the present disclosure. According to an embodiment, the computing device 800 may comprise at least one processor 810, and the processor 810 executes at least one computer-readable instruction (that is, the above-described elements implemented in the form of software) stored or encoded in a computer-readable storage medium (that is, the memory 810).

In one embodiment, the memory 810 stores a computer-executable instruction that, when executed, causes at least one processor 810 to: acquire a display instruction for displaying measurement information about the at least one second transmitter; and, after acquisition of the display instruction, display measurement information about the at least one second transmitter on a display screen of the first transmitter, wherein the at least one second transmitter and the first transmitter maintain data communication with the distributed I/O device along a pre-configured data transmission path, and measurement information about the at least one second transmitter is acquired via the distributed I/O device along the pre-configured data transmission path.

It should be understood that a computer-executable instruction stored in the memory 810, when executed, causes at least one processor 810 to perform various operations and functions described above in conjunction with FIGS. 1 to 7 in the various embodiments of the present disclosure.

According to one embodiment, a non-volatile machine-readable medium is provided. The non-volatile machine-readable medium may contain a machine-executable instruction (that is, the above-described elements implemented in the form of software) that, when executed by a machine, causes the machine to execute the various operations and functions described above in conjunction with FIGS. 1-7 in the various embodiments of the present disclosure.

According to one embodiment, a computer program is provided, comprising a computer-executable instruction that, when executed, causes at least one processor to perform various operations and functions described above in conjunction with FIGS. 1-7 in the various embodiments of the present disclosure.

According to one embodiment, a computer program product is provided, comprising a computer-executable instruction that, when executed, causes at least one processor to perform various operations and functions described above in conjunction with FIGS. 1-7 in the various embodiments of the present disclosure.

While example embodiments have been described above in conjunction with the specific implementations illustrated by the drawings, the embodiments are not all embodiments that may be implemented or fall within the protection scope of the claims. The term "exemplary" or "example" used throughout this description means "serving as an example, instance, or illustration", instead of implying being "preferred" or "advantageous" over other embodiments. Specific embodiments include specific details for the purpose of providing an understanding of the described techniques. However, these techniques may be implemented without these specific details. In some instances, in order to avoid causing any difficulties in understanding the concepts of the described embodiments, well-known structures and devices are shown in the form of block diagrams.

The preceding description of the present disclosure is provided to allow those of ordinary skill in the art to implement or use the present disclosure. It is readily apparent to those of ordinary skill in the art that various modifications may be made to the present disclosure, and that the general principles defined herein may also be applied to other variants without departing from the scope of protection of the present disclosure. Therefore, the present disclosure, instead of being limited to the examples and designs described herein, is consistent with the widest scope that conforms to the principles and novel characteristics disclosed herein.

What is claimed is:

1. A method for displaying measurement information, the method comprising:
    acquiring, by a first transmitter, a display instruction for displaying the measurement information, the measurement information being generated by at least one second transmitter, and each of the first transmitter and the at least one second transmitter being one of,
        a temperature transmitter configured to convert a temperature into a first signal for control or remote transmission, or
        a pressure transmitter configured to convert a pressure into a second signal for control or remote transmission; and the display instruction including device type information corresponding to the at least one second transmitter;
    determining a respective display format of the measurement information generated by each corresponding second transmitter among the at least one second transmitter based on the device type information; and
    displaying, by the first transmitter, the measurement information on a display screen of the first transmitter after the acquiring the display instruction, the measurement information being acquired by the first transmitter via a distributed I/O device along a data transmission path from the at least one second transmitter, and the measurement information being displayed on the display screen in the respective display format for each corresponding second transmitter among the at least one second transmitter.

2. The method of claim 1, wherein the at least one second transmitter comprises at least one of:
    a transmitter with a display screen; or
    a transmitter without a display screen.

3. The method of claim 1, wherein
    the acquiring the display instruction acquires the display instruction from an external source; or
    the acquiring the display instruction acquires the display instruction by operation of at least one display instruction button on the first transmitter.

4. The method of claim 1, wherein the data transmission path is a measurement information transmission path set according to a task.

5. The method of claim 1, further comprising:
    acquiring the measurement information,
    contemporaneous with the acquiring the display instruction, or
    before the acquiring the display instruction.

6. The method of claim 1, further comprising:
    storing the measurement information in association with identification information about the at least one second transmitter in a measurement information database, the display instruction including the identification information about the at least one second transmitter, and the measurement information about the at least one second transmitter is acquired from the measurement information database based on the identification information about the at least one second transmitter.

7. A non-transitory machine-readable storage medium storing an executable instruction that, when executed by at least one processor, causes the at least one processor to perform the method of claim 1.

8. A computer program product tangibly stored on a non-transitory computer-readable medium storing a computer-executable instruction that, when executed, causes at least one processor to perform the method of claim 1.

9. The method of claim 1, further comprising:
    selecting the first transmitter among a plurality of first transmitters based on a proximity to an operator; and
    configuring the data transmission path between the first transmitter and the at least one second transmitter based on the selecting.

10. The method of claim 1, wherein
the first transmitter and the at least one second transmitter are configured to transmit respective measurement information to a remote device manager; and
at least one first distance between the at least one second transmitter and the first transmitter is less than at least one second distance between the at least one second transmitter and the remote device manager.

11. The method of claim 1, wherein the at least one second transmitter does not include a display screen.

12. The method of claim 1, further comprising:
acquiring the measurement information from the distributed I/O device, the measurement information having been previously stored on the distributed I/O device.

13. A first transmitter for displaying measurement information, the first transmitter comprising:
a display screen;
a memory storing computer-executable instructions; and
at least one processor configured to execute the computer-executable instructions to cause the first transmitter to,
acquire the measurement information, the measurement information being generated by at least one second transmitter, and each of the first transmitter and the at least one second transmitter being one of,
a temperature transmitter configured to convert a temperature into a first signal for control or remote transmission, or
a pressure transmitter configured to convert a pressure into a second signal for control or remote transmission,
acquire a display instruction for displaying the measurement information, the display instruction including device type information corresponding to the at least one second transmitter,
determine a respective display format of the measurement information generated by each corresponding second transmitter among the at least one second transmitter based on the device type information, and
display the measurement information on the display screen after the acquisition of the display instruction, the measurement information being displayed on the display screen in the respective display format for each corresponding second transmitter among the at least one second transmitter.

14. The first transmitter of claim 13, wherein
the at least one processor is configured to execute the computer-executable instructions to cause the first transmitter to acquire the display instruction from an external source; or
the first transmitter further comprises at least one display instruction button, and the at least one processor is configured to execute the computer-executable instructions to cause the first transmitter to acquire the display instruction based on an operation of the at least one display instruction button.

15. The first transmitter of claim 13, wherein the at least one processor is configured to execute the computer-executable instructions to cause the first transmitter to acquire the measurement information:
contemporaneous with the acquisition of the display instruction; or
before the acquisition of the display instruction.

16. The first transmitter of claim 13, further comprising:
a measurement information database configured to store the measurement information in association with identification information about the at least one second transmitter, wherein
the display instruction includes the identification information about the at least one second transmitter, and
the at least one processor is configured to execute the computer-executable instructions to cause the first transmitter to acquire the measurement information from the measurement information database based on the identification information about the at least one second transmitter.

17. A system for displaying measurement information about at least one second transmitter, comprising:
the first transmitter of claim 13;
at least one second transmitter; and
a distributed I/O device.

18. A first transmitter for displaying measurement information, the first transmitter comprising:
a display screen;
a memory storing computer-executable instructions; and
at least one processor configured to execute the computer-executable instructions to cause the first transmitter to,
acquire a display instruction for displaying the measurement information, the measurement information being generated by at least one second transmitter, and each of the first transmitter and the at least one second transmitter being one of,
a temperature transmitter configured to convert a temperature into a first signal for control or remote transmission, or
a pressure transmitter configured to convert a pressure into a second signal for control or remote transmission, and the display instruction including device type information corresponding to the at least one second transmitter,
determine a respective display format of the measurement information generated by each corresponding second transmitter among the at least one second transmitter based on the device type information, and
display the measurement information on the display screen after the acquisition of the display instruction, the measurement information being displayed on the display screen in the respective display format for each corresponding second transmitter among the at least one second transmitter.

19. The first transmitter of claim 18, wherein
the at least one processor is configured to execute the computer-executable instructions to cause the first transmitter to acquire the display instruction from an external source; or
the first transmitter comprises at least one display instruction button, and the at least one processor is configured to execute the computer-executable instructions to cause the first transmitter to acquire the display instruction based on an operation of the at least one display instruction button.

20. The first transmitter of claim 18, wherein the at least one processor is configured to execute the computer-executable instructions to cause the first transmitter to acquire the measurement information:
contemporaneous with the acquisition of the display instruction; or
before the acquisition of the display instruction.

* * * * *